（12） United States Patent
Xiao et al.

(10) Patent No.: US 8,190,745 B2
(45) Date of Patent: *May 29, 2012

(54) METHODS AND APPARATUSES FOR ADJUSTING BANDWIDTH ALLOCATION DURING A COLLABORATION SESSION

(75) Inventors: Sihai Xiao, Fremont, CA (US); Yanghua Liu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/159,671

(22) Filed: Jun. 14, 2011

(65) Prior Publication Data

US 2011/0276635 A1 Nov. 10, 2011

Related U.S. Application Data

(63) Continuation of application No. 11/753,156, filed on May 24, 2007, now Pat. No. 7,979,550.

(51) Int. Cl.
*G06F 15/173* (2006.01)

(52) U.S. Cl. .......................... 709/226; 709/223; 709/224

(58) Field of Classification Search ........................ None
See application file for complete search history.

(56) References Cited

U.S. PATENT DOCUMENTS

| | | | | | |
|---|---|---|---|---|---|
| 5,649,105 | A | * | 7/1997 | Aldred et al. | 709/220 |
| 5,751,712 | A | * | 5/1998 | Farwell et al. | 370/431 |
| 5,796,724 | A | * | 8/1998 | Rajamani et al. | 370/263 |
| 6,396,816 | B1 | * | 5/2002 | Astle et al. | 370/264 |
| 6,453,336 | B1 | * | 9/2002 | Beyda et al. | 709/204 |
| 6,735,633 | B1 | * | 5/2004 | Welch et al. | 709/233 |
| 6,771,661 | B1 | * | 8/2004 | Chawla et al. | 370/468 |
| 6,876,668 | B1 | * | 4/2005 | Chawla et al. | 370/468 |
| 6,957,071 | B1 | * | 10/2005 | Holur et al. | 455/452.2 |
| 7,062,559 | B2 | * | 6/2006 | Yoshimura et al. | 709/226 |
| 7,299,284 | B2 | * | 11/2007 | McKinnon et al. | 709/225 |
| 7,564,872 | B1 | * | 7/2009 | Chawla et al. | 370/468 |

(Continued)

FOREIGN PATENT DOCUMENTS

WO WO2005/104490 A1 11/2005

OTHER PUBLICATIONS

PCT Notification of Transmittal of the International Search Report and the Written Opinion of the International Searching Authority, or the Declaration, International Application No. PCT/US2008/006619, International Filing Date: May 23, 2008, Date of Document Mailing: Oct. 6, 2008, 11 pages.

*Primary Examiner* — David England

(57) ABSTRACT

In one embodiment, a participant device joins a collaboration session among a plurality of participant devices. The content shared within the collaboration session includes lower-priority data and higher-priority data. An initial available bandwidth for use with the collaboration session is determined. Based on the initial available bandwidth and an expected second bandwidth for higher-priority data shared within the collaboration session, a first bandwidth is allocated for lower-priority data shared within the collaboration session. During the collaboration session, an actual second bandwidth for the higher-priority data shared within the collaboration session is monitored. The expected second bandwidth is compared to the monitored actual second bandwidth, and a bandwidth variant is determined. Based on the determined bandwidth variant, the first bandwidth allocated for the lower-priority data shared within the collaboration session is adjusted to increase the bandwidth allocated for the lower-priority data.

20 Claims, 5 Drawing Sheets

U.S. PATENT DOCUMENTS

| | | | |
|---|---|---|---|
| 7,627,629 B1* | 12/2009 | Wu et al. | 709/204 |
| 2002/0093983 A1* | 7/2002 | Newberg et al. | 370/468 |
| 2002/0129143 A1* | 9/2002 | McKinnon et al. | 709/225 |
| 2002/0181686 A1* | 12/2002 | Howard et al. | 379/202.01 |
| 2003/0018719 A1* | 1/2003 | Ruths et al. | 709/205 |
| 2003/0069972 A1* | 4/2003 | Yoshimura et al. | 709/226 |
| 2004/0015602 A1* | 1/2004 | Goldhammer et al. | 709/235 |
| 2004/0153504 A1* | 8/2004 | Hutchinson et al. | 709/204 |
| 2004/0199580 A1* | 10/2004 | Zhakov et al. | 709/204 |
| 2005/0272438 A1* | 12/2005 | Holur et al. | 455/452.2 |
| 2007/0064732 A1* | 3/2007 | Liaw et al. | 370/468 |
| 2007/0180119 A1* | 8/2007 | Khivesara et al. | 709/226 |
| 2008/0040746 A1* | 2/2008 | Shae et al. | 725/44 |
| 2008/0112337 A1* | 5/2008 | Shaffer et al. | 370/260 |
| 2008/0294758 A1* | 11/2008 | Xiao et al. | 709/221 |
| 2010/0088414 A1* | 4/2010 | Lin et al. | 709/227 |
| 2010/0192213 A1* | 7/2010 | Ta et al. | 726/7 |

* cited by examiner

METHODS AND APPARATUSES FOR ADJUSTING BANDWIDTH ALLOCATION DURING A COLLABORATION SESSION

RELATED APPLICATIONS

This application is a continuation of U.S. patent application Ser. No. 11/753,156 filed on May 24, 2007 by Sihai Xiao et al., and entitled "Methods and Apparatuses for Adjusting Bandwidth Allocation During a Collaboration Session", the contents of which are incorporated by reference herein in their entirety.

FIELD OF INVENTION

The present invention relates generally to adjusting bandwidth and, more particularly, to adjusting bandwidth during a collaboration session.

BACKGROUND

There has been an increased use in collaboration sessions that are Internet or web-based to communicate with employees, vendors, and clients. During these collaboration sessions, information is typically exchanged between multiple participants. This exchanged information or content may include audio, graphical, and/or textual information. Different types of content have different delivery requirements in terms of timeliness of delivery and the size of the content.

SUMMARY

In one embodiment, the systems and methods determine an initial bandwidth at a client device; allocate an allocated bandwidth to the client device between a first server and a second server; monitor the allocated bandwidth; and adjust the allocated bandwidth based on a target bandwidth from the first server to the client.

BRIEF DESCRIPTION OF THE DRAWINGS

The accompanying drawings, which are incorporated in and constitute a part of this specification, illustrate and explain one embodiment of the methods and apparatuses for adjusting bandwidth allocation during a collaboration session. In the drawings.

DETAILED DESCRIPTION

The following detailed description of the methods and apparatuses for adjusting bandwidth allocation during a collaboration session refers to the accompanying drawings. The detailed description is not intended to limit the methods and apparatuses for adjusting bandwidth allocation during a collaboration session. Instead, the scope of the methods and apparatuses for adjusting bandwidth allocation during a collaboration session is defined by the appended claims and equivalents. Those skilled in the art will recognize that many other implementations are possible, consistent with the present invention.

References to a device include a device utilized by a user such as a desktop computer, a portable computer, a personal digital assistant, a video phone, a landline telephone, a cellular telephone, and a device capable of receiving/transmitting an electronic signal.

References to content include audio, video, graphical, and/or textual data.

References to a collaboration session include a plurality of devices that are configured to view content submitted by one of the devices.

References to a participant device include devices that are participating in the collaboration session.

References to a presenter device include a device that is a participant in the collaboration session and shares content shared with other participants.

References to an attendee device include a device that is a participant in the collaboration session and receives content shared by another participant device. The attendee devices are capable of receiving and presenting to users in a user discernable format content that is offered by the presenter device. In some instances, the attendee devices are capable of modifying the content shared by the presenter device.

Figure 1:
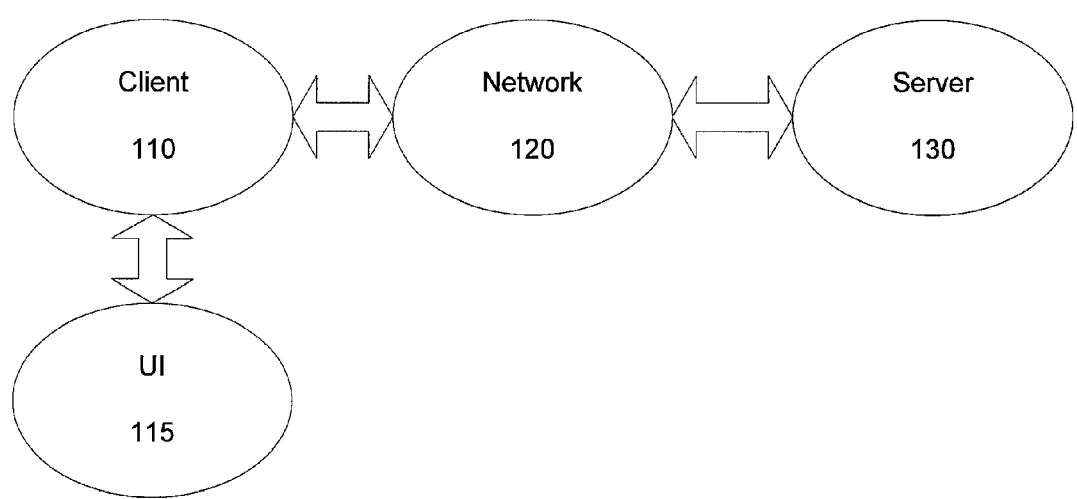
FIG. 1 is a diagram illustrating an environment within which the methods and apparatuses for adjusting bandwidth allocation during a collaboration session are implemented.

FIG. 1 is a diagram illustrating an environment within which the methods and apparatuses for adjusting bandwidth allocation during a collaboration session are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., a keypad, a video display screen, input and output interfaces, etc., in the same housing such as a personal digital assistant). In other embodiments, one or more user interface 115 components (e.g., a keyboard, a pointing device such as a mouse, a trackball, a microphone, a speaker, a display, a camera, etc.) are physically separate from, and are conventionally coupled to, the electronic device 110. In one embodiment, the user utilizes interface 115 to access and control content and applications stored in electronic device 110, server 130, or a remote storage device (not shown) coupled via network 120.

In accordance with the invention, embodiments of adjusting bandwidth allocation during a collaboration session below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
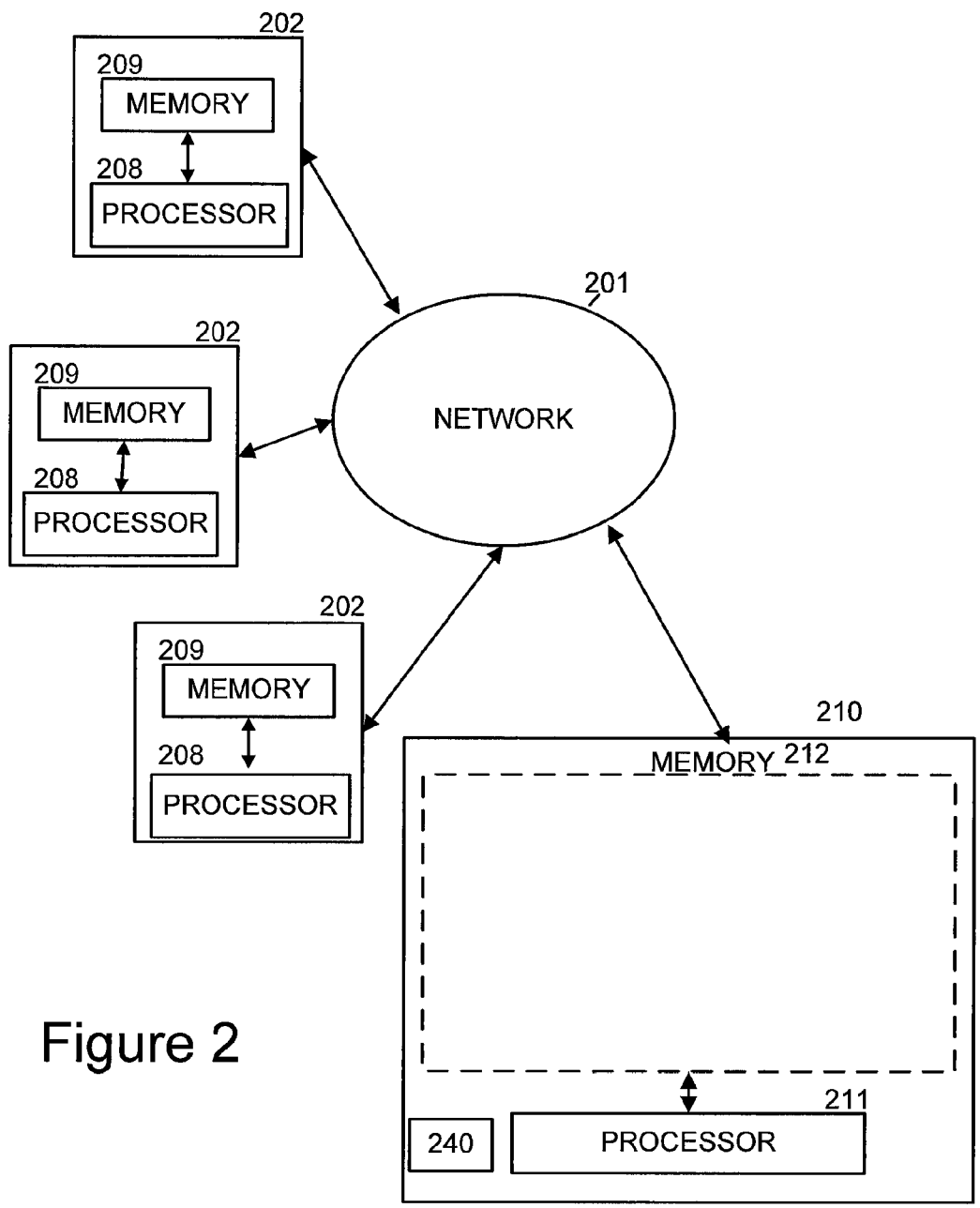
FIG. 2 is a simplified block diagram illustrating one embodiment in which 10 the methods and apparatuses for adjusting bandwidth allocation during a collaboration session are implemented.

FIG. 2 is a simplified diagram illustrating an exemplary architecture in which the methods and apparatuses for adjusting bandwidth allocation during a collaboration session are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for selectively sharing a portion of a display during a collaboration session. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212.

In one instance, a stored user application, regardless of storage location, is made customizable based on adjusting bandwidth allocation during a collaboration session as determined using embodiments described below.

Figure 3:
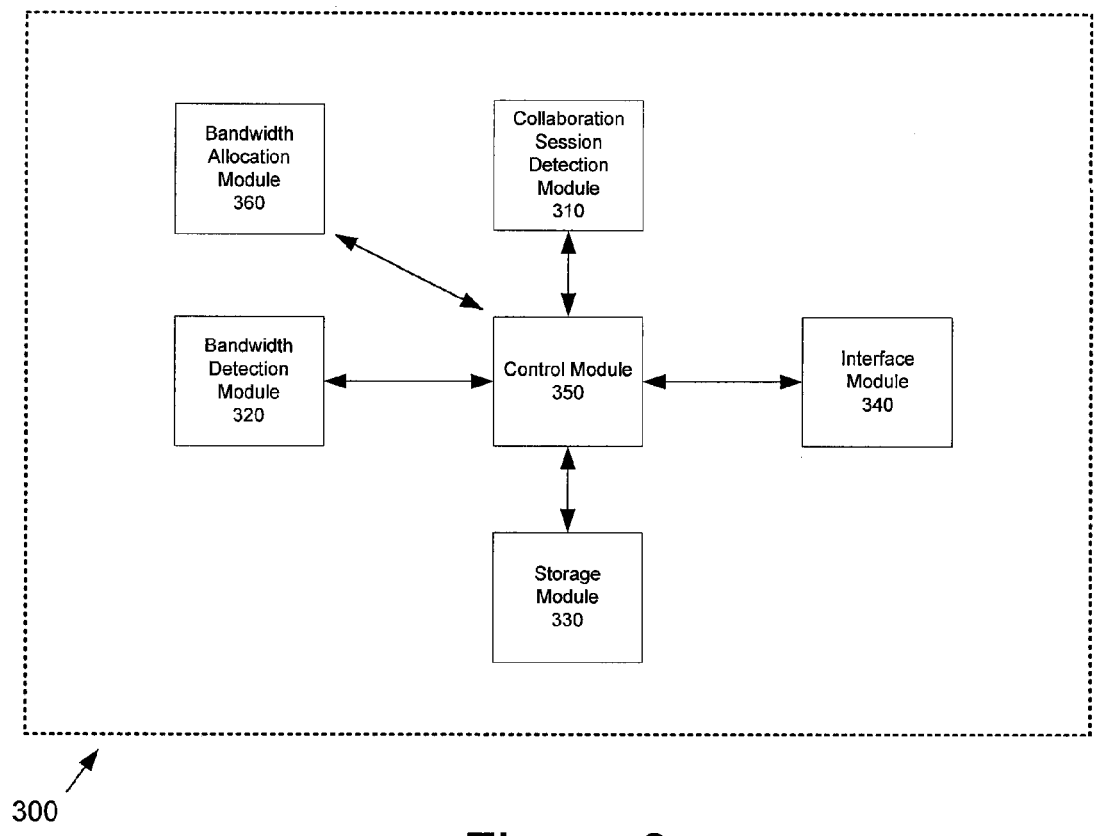
FIG. 3 is a simplified block diagram illustrating a system, consistent with one embodiment of the methods and apparatuses for adjusting bandwidth allocation during a collaboration session.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a collaboration session detection module 310, a bandwidth detection module 320, a storage module 330, an interface module 340, a control module 350, and a bandwidth allocation module 360.

In one embodiment, the control module 350 communicates with the collaboration session detection module 310, the bandwidth detection module 320, the storage module 330, the interface module 340, and the bandwidth allocation module 360. In one embodiment, the control module 350 coordinates tasks, requests, and communications between the collaboration session detection module 310, the bandwidth detection module 320, the storage module 330, the interface module 340, and the bandwidth allocation module 360.

In one embodiment, the collaboration detection module 310 detects a collaboration session between multiple participants. In one embodiment, the collaboration session includes sharing content among the participants through a display device. For example, voice and data content may be shared through the display device such as a computer system, a cellular phone, a personal digital assistant, and the like.

Further, the content may include graphical and textual data through word processors, chat windows, documents, and the like.

In one embodiment, the bandwidth detection module 320 determines a specific available bandwidth at a participant's device. In one embodiment, the specific available bandwidth is determined based on the connection type of the participant's device. For example, the connection type includes a telephone modem connection, Wifi connection, a DSL connection, a T1 line, and the like. In this embodiment, different available bandwidths are associated with the different connection types without measuring the actual bandwidth available to the participant's device.

In another embodiment, the specific available bandwidth at the participant's device is determined by measuring the actual available bandwidth. In this embodiment, transmission of test data may be utilized to measure the available bandwidth at the participant's device. In one embodiment, the measurement of the available bandwidth for the participant's device is performed at the participant's device.

In one embodiment, the storage module 330 stores content associated with the allocating bandwidth to the participant's device for the collaboration session. Further, the storage module 330 is also configured to store information corresponding to the participants of the collaboration session. Further yet, the storage module 330 is also configured to store content shared during the collaboration session.

In one embodiment, the interface detection module 340 detects when the text messages are being transmitted from one of the devices participating in the collaboration session. In another embodiment, the interface detection module 340 monitors the voice transmissions originating from one of the devices participating in the collaboration session. In yet another embodiment, the interface detection module 340 detects any activity by one of the devices participating in the collaboration session.

In one embodiment, the interface module 340 receives a signal from one of the electronic devices 110. In one embodiment, the electronic devices 110 are participating in a collaboration session. In another embodiment, the interface module 340 delivers a signal to one of the electronic devices 110.

In one embodiment, the bandwidth allocation module 360 determines how much bandwidth is allocated to various types of content that is shared within the collaboration session. In one embodiment, different types of content include audio data, video data, graphical data, and textual data. In some embodiments, audio data and video data require deliver to various participant devices more quickly than other types of shared content within a collaboration session. In one example, the audio and video data are delivered in as close to real time as possible. For example, voice that is embodied within the audio data is less useful when delayed and may contribute to a deterioration in user experience when prolonged voice latency occurs. Similarly, video data that suffers lengthy delays from receipt by the participant device degrade the overall user experience within the collaboration session. In one embodiment, the voice data is given higher priority than the video data.

In one embodiment, different percentages of bandwidth availability are allocated to different types of content. For example, Equation 1 below describes the current bandwidth to receive data (CBW) in relation to the initial available network bandwidth (IBW) and the expected bandwidth to send VoIP packets (C). In another embodiment, C can represent any data that has a high priority for delivery.

$$CBW = IBW - C \qquad \text{(Equation 1)}$$

In one embodiment, the CBW is subsequently adjusted based Equation 2 found below.

$$VBV = C - VCR \qquad \text{(Equation 2)}$$

The VoIP bandwidth variant is represented by VBV; and VoIP receiving rate and bandwidth detecting data are represented by VCR. In one embodiment, the participant's device periodically detects the VCR to calculate the VBV. If the VBV is less than zero, then greater bandwidth can be allocated to data and the CBW can be increased without decreasing the throughput of the VoIP packets. Similarly, if the VBV is greater than zero, then less bandwidth can be allocated to data and the CBW can be decreased to maintain acceptable throughput for the VoIP packets.

In one embodiment, the adjustment of the bandwidth allocation is made over a predetermined period of time. In another embodiment, the adjustment of the bandwidth allocation is also adjusted as a percentage of the overall bandwidth.

In one embodiment, one or more functions associated with the bandwidth detection module 320 and bandwidth allocation module 360 are performed locally 15 within the participant's device.

The system 300 in FIG. 3 is shown for exemplary purposes and is merely one embodiment of the methods and apparatuses for adjusting bandwidth allocation during a collaboration session. Additional modules may be added to the system 300 without departing from the scope of the methods and apparatuses for adjusting bandwidth allocation during a collaboration session. Similarly, modules may be combined or deleted without departing from the scope of the methods and apparatuses for adjusting bandwidth allocation during a collaboration session.

Figure 4:
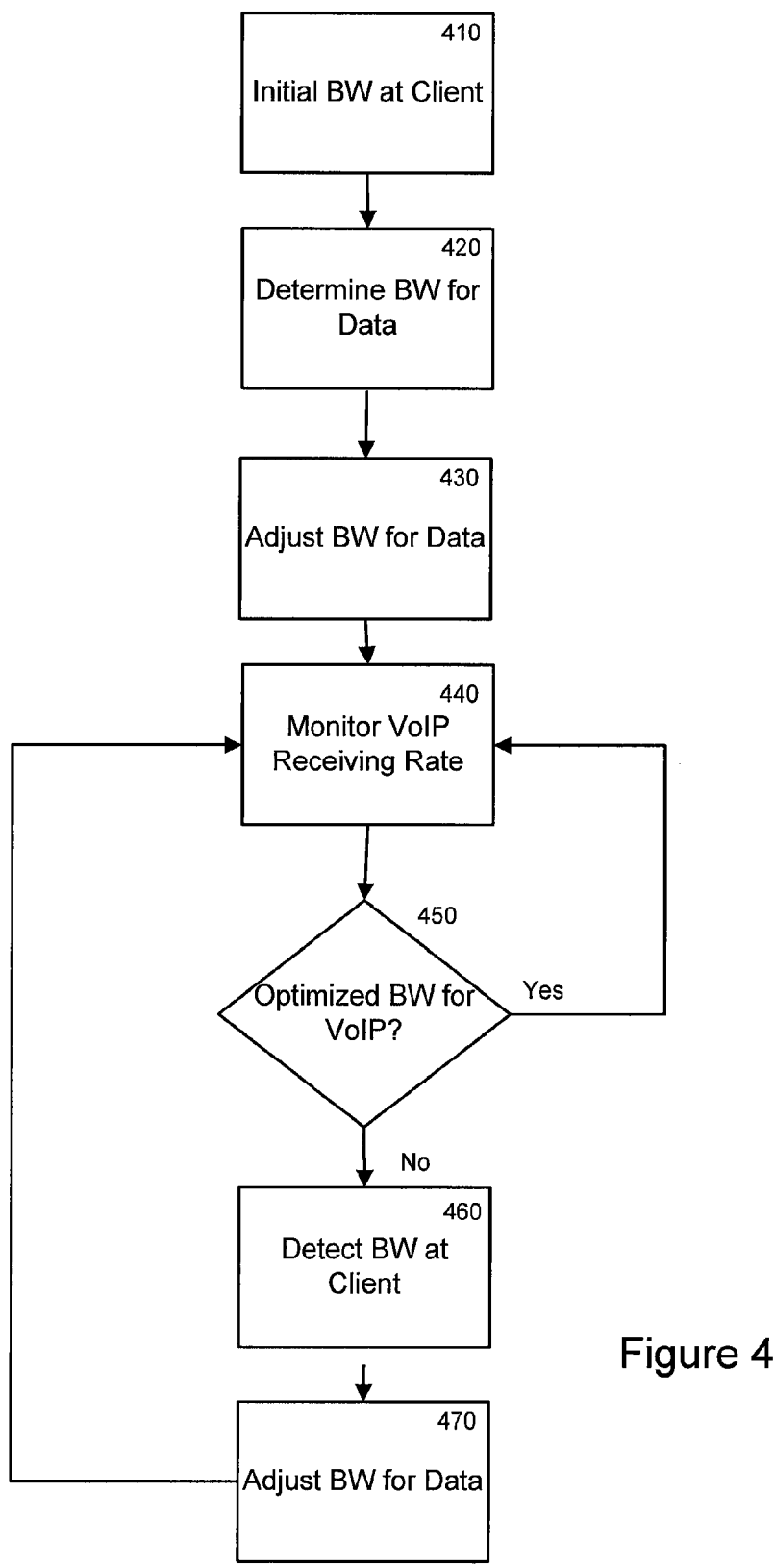
FIG. 4 is a flow diagram consistent with one embodiment of the methods and apparatuses for adjusting bandwidth allocation during a collaboration session.

The flow diagram as depicted in FIG. 4 is one embodiment of the methods and apparatuses for adjusting bandwidth allocation during a collaboration session. The blocks within the flow diagram can be performed in a different sequence without departing from the spirit of the methods and apparatuses for adjusting bandwidth allocation during a collaboration session. Further, blocks can be deleted, added, or combined without departing from the spirit of the methods and apparatuses for adjusting bandwidth allocation during a collaboration session.

The flow diagram in FIG. 4 illustrates adjusting bandwidth allocation during a collaboration session according to one embodiment of the invention. In Block 410, an initial bandwidth is detected at the client. In one embodiment, the client represents the participant's device within a collaboration session. In one embodiment, the initial bandwidth is detected by the bandwidth detection module 320. In one embodiment, the actual bandwidth to the client is detected. In another embodiment, the initial bandwidth is assigned based on the connection type associated with the client.

In Block 420, bandwidth allocation for data is determined. In one embodiment, the formula shown in Equation 1 is utilized to determine the bandwidth allocation for data.

In Block 430, the bandwidth allocation for data is adjusted based on the bandwidth determined within the Block 430. In one embodiment, the bandwidth allocation for data allocation is transmitted from the client to a remote server. Further, the client represents the participant's device in one embodiment, and the remote server represents a collaboration session server.

In Block 440, the VoIP receiving rate is monitored. In one embodiment, the VoIP receiving rate is monitored at the client. In another embodiment, the 5 VoIP receiving rate is monitored at a remote server.

In Block 450, if the bandwidth allocated to the VoIP receiving rate is optimized, then the VoIP receiving rate is continued to be monitored within the Block 440.

In Block 450, if the bandwidth for the VoIP is not optimized, then the 10 current bandwidth is detected at the client in Block 460. In one embodiment, the current bandwidth is detected by the bandwidth detection module 320.

In one embodiment, the optimization is determined based on the allocation of the data bandwidth and the VoIP bandwidth. An exemplary relationship for bandwidth allocation is illustrated within Equation 2.

In Block 470, the bandwidth for data is adjusted based on the optimization in the Block 450 and the current bandwidth detected in the Block 460.

Figure 5:
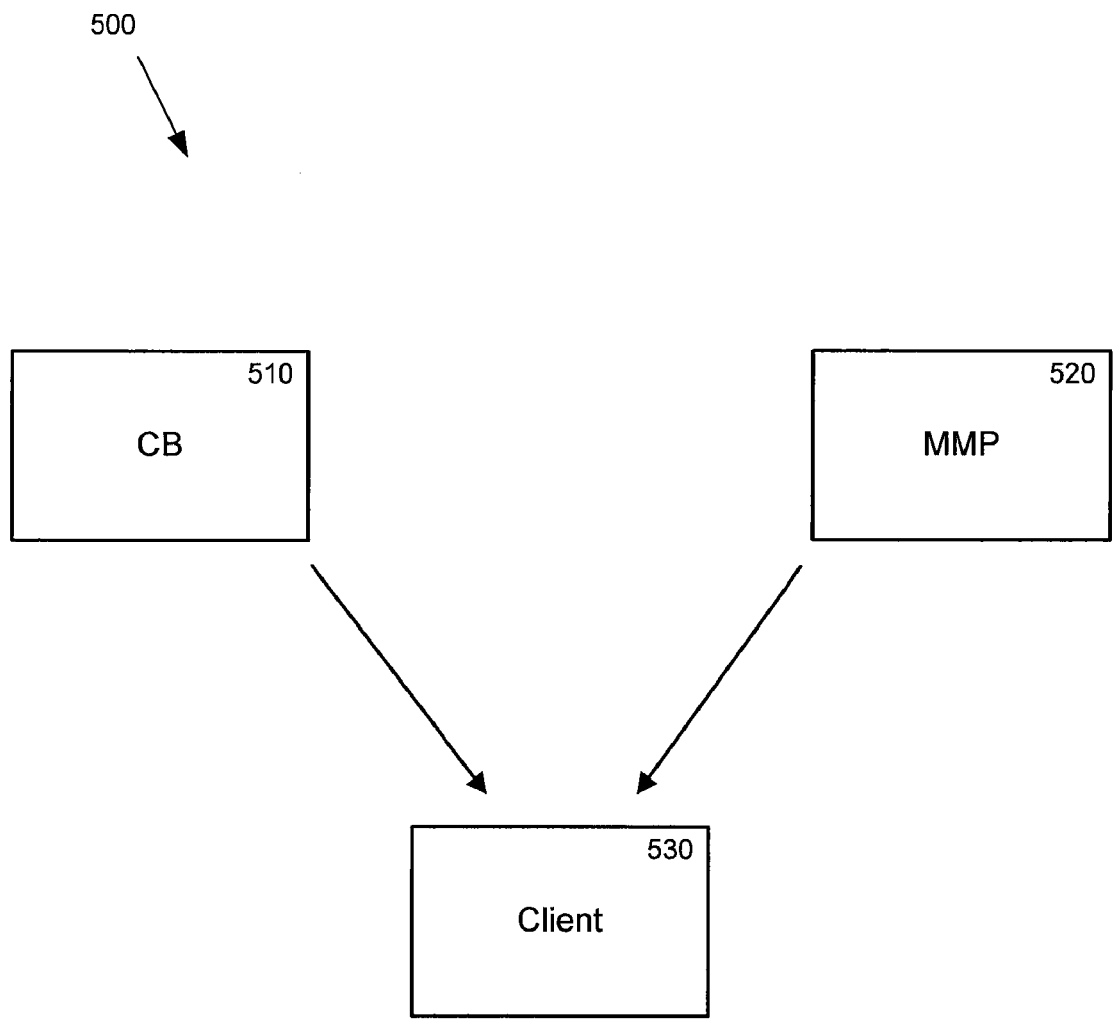
FIG. 5 is a simplified block diagram illustrating one embodiment in which the methods and apparatuses for adjusting bandwidth allocation during a 20 collaboration session are implemented.

FIG. 5 illustrates one embodiment of a system 500. In one embodiment, the system 500 is embodied within the server 130. In another embodiment, the system 500 is embodied within the electronic device 110. In yet another embodiment, the system 500 is embodied within both the electronic device 110 and the server 130.

In one embodiment, the system 500 includes a meeting server 510, a multimedia server 520, and a client 530. In one embodiment, the meeting server distributes chat data, document data, file data, and the like to the client 530. In one embodiment, the multimedia server 520 distributes VoIP data and video data to the client 530. In one embodiment, the client represents a device utilized by a participant within a collaboration session and receives data from both the meeting server 510 and the multimedia server 520.

In one embodiment, the bandwidth allocation, as described above and illustrated within FIGS. 3 and 4, divides the available bandwidth between the meeting server 510 and the multimedia server 520.

The foregoing descriptions of specific embodiments of the invention have 10 been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:

joining, by a participant device, a collaboration session among a plurality of participant devices, at least one participant device of the plurality of participant devices operating as a presenter device that shares content within the collaboration session, and at least one participant device of the plurality of participant devices operating as an attendee device that receives content shared within the collaboration session, the content shared within the collaboration session to include lower-priority data and higher-priority data;

determining an initial available bandwidth at the participant device for use with the collaboration session;

based on the initial available bandwidth and an expected second bandwidth at the participant device for higher-priority data shared within the collaboration session, allocating a first bandwidth at the participant device for lower-priority data shared within the collaboration session;

monitoring, during the collaboration session, an actual second bandwidth at the participant device for the higher-priority data shared within the collaboration session;

comparing the expected second bandwidth to the monitored actual second bandwidth, and determining therefrom a bandwidth variant; and based on the determined bandwidth variant, adjusting, during the collaboration session, the first bandwidth allocated at the participant device for the lower-priority data shared within the collaboration session to increase the bandwidth allocated at the participant device for the lower-priority data.

2. The method of claim 1, wherein the determining comprises:
estimating the initial available bandwidth based on a connection type of the participant device's connection to a network.

3. The method of claim 2, wherein the connection type is selected from the group consisting of: a modem connection, a Digital Subscriber Line (DSL) connection and a T1 connection.

4. The method of claim 1, wherein the lower-priority data includes graphical data or textual data and the higher-priority data includes audio data.

5. The method of claim 1, wherein the lower-priority data includes video data and the higher-priority data includes audio data.

6. The method of claim 1, wherein the lower-priority data includes document data or file data and the higher-priority data includes Voice over Internet Protocol (VoIP) data.

7. The method of claim 1, further comprising:
passing the lower-priority data shared between the participant device and a meeting server to share the data within the collaboration session; and
passing the higher-priority data between the participant device and a multimedia server, that is separate from the meeting server, to share the data within the collaboration session.

8. The method of claim 1, wherein the allocating allocates the first bandwidth based on the initial available bandwidth and the expected second bandwidth by evaluating a formula:

$$CBW=IBW-C$$

where CBW represents the first bandwidth, IBW represents the initial available bandwidth and C represents expected second bandwidth at the participant device for higher-priority data shared within the collaboration session.

9. The method of claim 1, wherein the comparing and determining therefrom determines the bandwidth variant by evaluating a formula:

$$VBV=C-VCR$$

where VBV represents the bandwidth variant, C represents expected second bandwidth at the participant device for higher-priority data shared within the collaboration session, and VCR represents the monitored actual second bandwidth at the participant device for the higher-priority data shared within the collaboration session.

10. The method of claim 1, further comprising
transmitting an indication of the allocated first bandwidth at the participant device to a meeting server associated with the collaboration session.

11. An apparatus comprising:
a processor; and
a memory storing program instructions that, when executed on the processor, are operable to
determine an initial available bandwidth for use with a collaboration session, wherein the collaboration session includes at least one presenter device that shares content within the collaboration session, and at least attendee device that receives content shared within the collaboration session, the content shared within the collaboration session to include lower-priority data and higher-priority data,
based on the initial available bandwidth and an expected second bandwidth for higher-priority data shared within the collaboration session, allocate a first bandwidth for lower-priority data shared within the collaboration session,
monitor, during the collaboration session, an actual second bandwidth for the higher-priority data shared within the collaboration session,
compare the expected second bandwidth to the monitored actual second bandwidth, and determine therefrom a bandwidth variant, and
adjust, during the collaboration session, the first bandwidth for lower-priority data shared within the collaboration session to increase the bandwidth allocated for the lower-priority data to use at least a portion of the bandwidth variant.

12. The apparatus of claim 11, wherein the program instructions that, when executed on the processor, are operable to determine an initial available bandwidth, further comprise program instructions that, when executed on the processor, are operable to estimate the initial available bandwidth based on a connection type of a connection to a network.

13. The apparatus of claim 12, wherein the connection type is selected from the group consisting of: a modem connection, a Digital Subscriber Line (DSL) connection and a T1 connection.

14. The apparatus of claim 11, wherein the lower-priority data includes graphical data or textual data and the higher-priority data includes audio data.

15. The apparatus of claim 11, wherein the lower-priority data includes video data and the higher-priority data includes audio data.

16. The apparatus of claim 11, wherein the lower-priority data includes document data or file data and the higher-priority data includes Voice over Internet Protocol (VoIP) data.

17. The apparatus of claim 11, wherein the first bandwidth is allocated based on evaluation of a formula:

$$CBW=IBW-C$$

where CBW represents the first bandwidth, IBW represents the initial available bandwidth and C represents expected second bandwidth for higher-priority data shared within the collaboration session.

18. The apparatus of claim 11, wherein the bandwidth variant is determined by evaluation of a formula:

$$VBV=C-VCR$$

where VBV represents the bandwidth variant, C represents expected second bandwidth for higher-priority data shared within the collaboration session, and VCR represents the monitored actual second bandwidth for the higher-priority data shared within the collaboration session.

19. The apparatus of claim 11, wherein the program instructions, when executed on the processor, are further operable to
transmit an indication of the allocated first bandwidth to a meeting server associated with the collaboration session.

20. Software encoded on one or more non-transitory computer-readable media and when executed operable to:
determine an initial available bandwidth for use with a collaboration session, wherein the collaboration session includes at least one presenter device that shares content within the collaboration session, and at least attendee device that receives content shared within the collaboration session, the content shared within the collaboration session to include lower-priority data and higher-priority data;

based on the initial available bandwidth and an expected second bandwidth for higher-priority data shared within the collaboration session, allocate a first bandwidth for lower-priority data shared within the collaboration session;

monitor, during the collaboration session, an actual second bandwidth for the higher-priority data shared within the collaboration session;

compare the expected second bandwidth to the monitored actual second bandwidth, and determine therefrom a bandwidth variant; and based on the determined bandwidth variant, adjust, during the collaboration session, the first bandwidth for lower-priority data shared within the collaboration session to increase the bandwidth allocated for the lower-priority data.

* * * * *